Dec. 19, 1944.　　　H. R. POSTON ET AL　　　2,365,589
LOAD WEIGHING DEVICE FOR VEHICLES
Filed Aug. 30, 1944　　　3 Sheets-Sheet 1

Inventors
Howard R. Poston
Paul C. Felrel
By Clarence A. O'Brien
and Harvey B. Jacobson
Attorneys Dec. 19, 1944. H. R. POSTON ET AL 2,365,589
LOAD WEIGHING DEVICE FOR VEHICLES
Filed Aug. 30, 1944 3 Sheets-Sheet 3
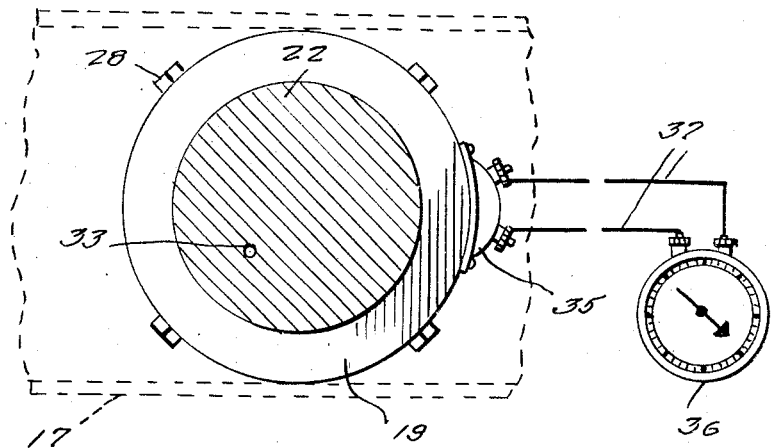
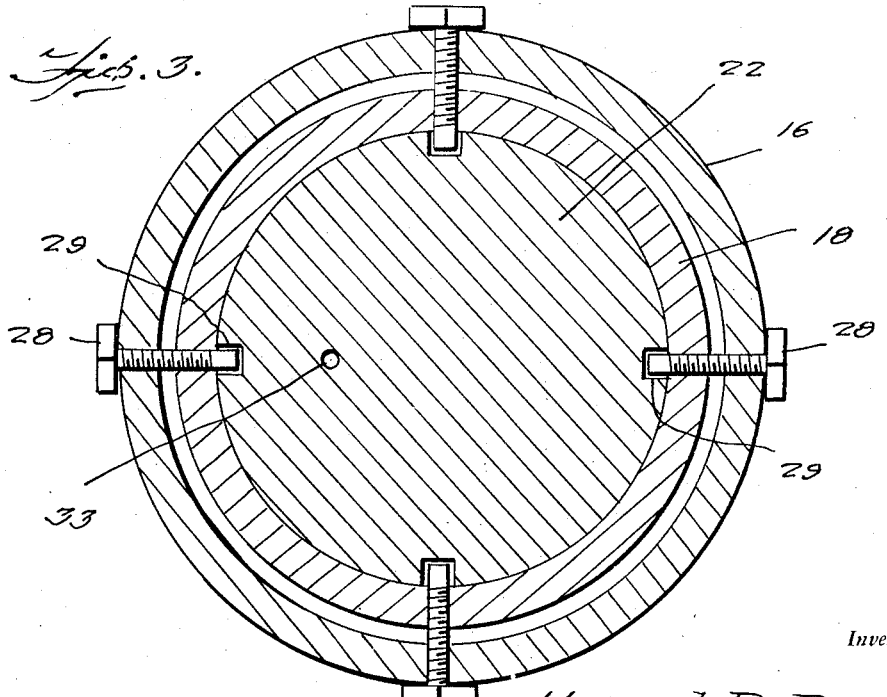
Inventors
Howard R. Poston
Paul C. Felkel
By Clarence A. O'Brien
and Harvey B. Jacobson
Attorneys Patented Dec. 19, 1944

2,365,589

UNITED STATES PATENT OFFICE 2,365,589

LOAD WEIGHING DEVICE FOR VEHICLES

Howard R. Poston, Bridge, and Paul C. Felkel, Myrtle Point, Oreg.

Application August 30, 1944, Serial No. 551,832

3 Claims. (Cl. 265—40)

This invention relates to a load weighing device for vehicles of that class wherein the load support and chassis of the vehicle are capable of relative turning movement about a vertical axis to facilitate steering.

More particularly, the present invention is especially designed for use between the chassis and the load supporting bunk of a tractor unit or trailer of a lumber truck.

An important object of the present invention is to provide a load weighing device of the above kind which is comparatively simple and durable in construction, efficient in use, and capable of being readily and economically incorporated in the tractor unit or trailer construction of a lumber truck.

The present invention consists in the novel form, combination and arrangement of parts hereinafter more fully described, shown in the accompanying drawings and claimed.

In the drawings, wherein like reference characters indicate corresponding parts throughout the several views:

Figure 3 is a horizontal section taken on line 3—3 of Figure 2.

Figure 4 is a section taken on line 4—4 of Figure 2 and drawn on a reduced scale, as well as additionally showing the load indicating means in elevation.

Figure 1:
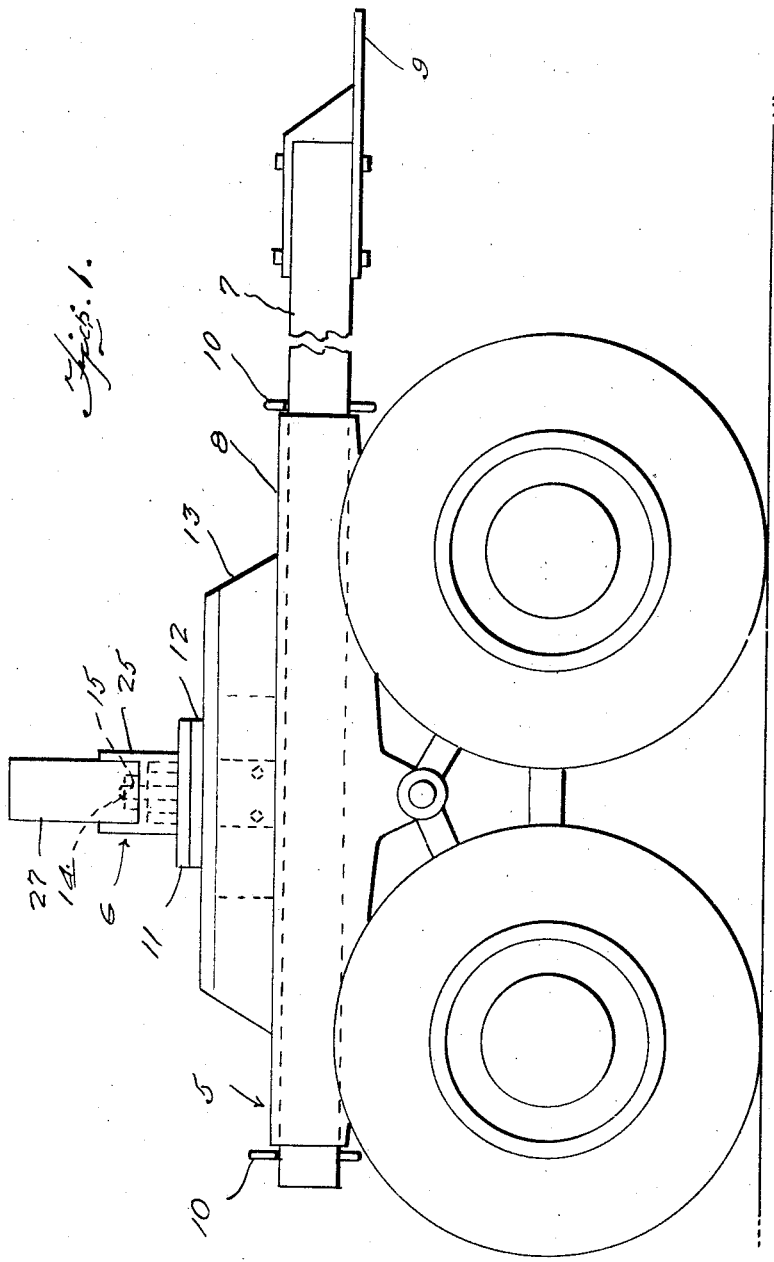
Figure 1 is a side elevational view, partly broken away, of the trailer of a lumber truck equipped with a load weighing device embodying the present invention.

Referring in detail to the drawings, 5 indicates the chassis of the trailer of a conventional lumber truck, and 6 indicates the load supporting bunk of said trailer. A similar bunk is similarly mounted on the rear of the tractor unit of this type of truck, as is well known in the art, the logs resting on the bunks of the tractor unit and the trailer constituting the mechanical or towing connection between the tractor unit and the trailer when the truck is loaded with logs. As usual, a coupling pole 7 is slidable in the portion 8 of the chassis frame of the trailer and has means 9 at its forward end for connection with the tractor unit. Removable pins 10 prevent sliding movement of the pole 7 so that the latter may be employed for towing purposes when the truck is not loaded. These pins are removed when the truck is loaded so that the logs form the mechanical connection between the tractor unit and the trailer, as is well known in the art, the hitch means 9 merely providing for lateral steering of the tractor unit relative to the trailer.

In order to permit free steering, the bunk 6 of the trailer, as well as that of the tractor unit, is provided with a fifth wheel construction embodying a bearing disc 11 carried by the bunk 6 and resting upon a second bearing disc 12 mounted on the raised portion 13 of the chassis frame of the trailer or tractor unit. A king bolt 14 extends through the discs 11 and 12 centrally of the latter to form the pivotal axis about which the bunk and chassis are permitted relative turning movement. A nut 15 is threaded on the king bolt 14 to prevent the bunk and its bearing disc 11 from shifting upwardly on the king bolt 14 and to thereby maintain the discs 11 and 12 in contact with each other. The construction thus far described is conventional and well known in the lumber truck art. As the essential structural features are the same with respect to both the tractor unit and the trailer, it has only been illustrated in connection with the trailer of the lumber truck.

Figure 2:
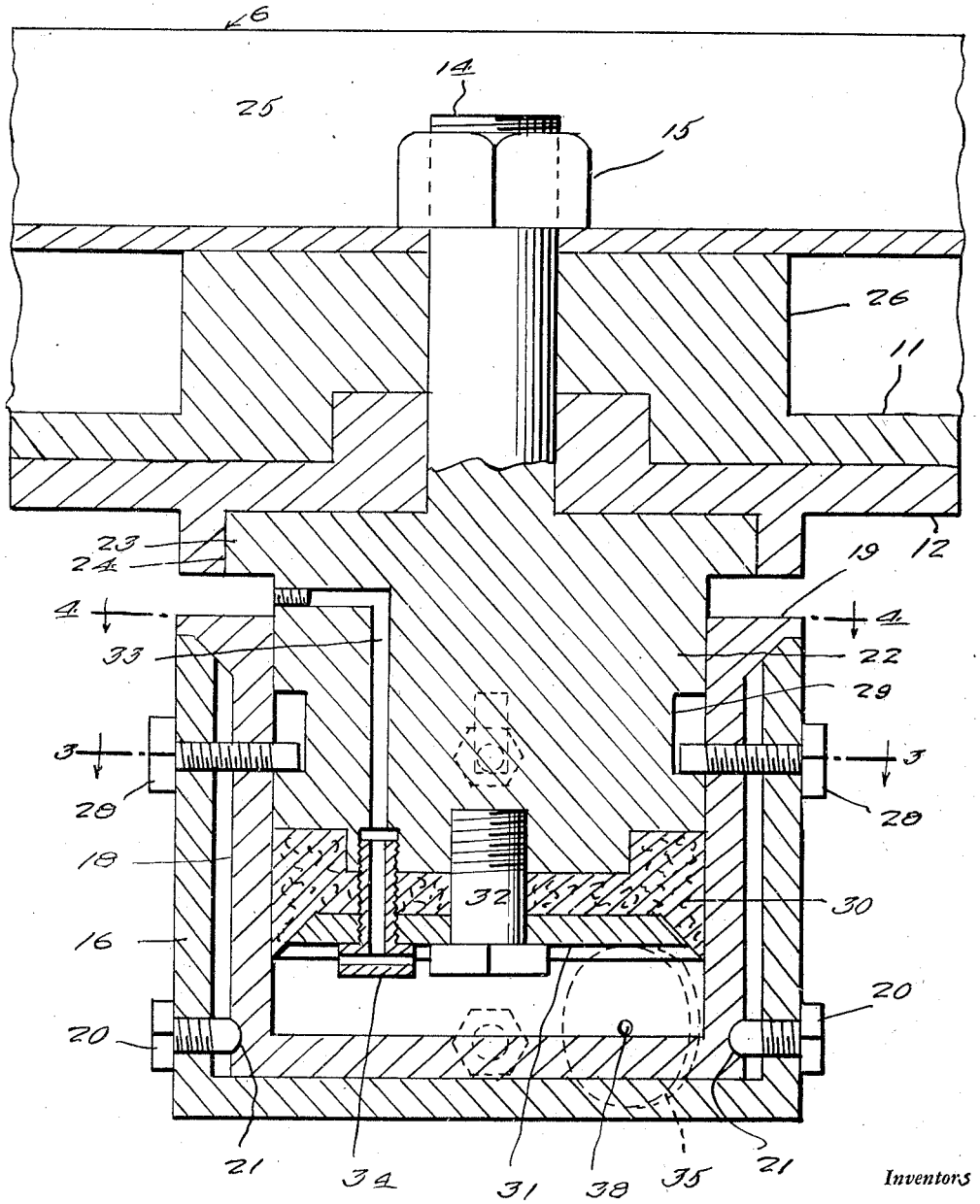
Figure 2 is an enlarged fragmentary vertical sectional view taken through the load weighing device and the central portion of the bunk of the trailer shown in Figure 1.

In accordance with the present invention, a cylindrical open top casing 16 is rigidly fixed within the elevated frame portion 13 of the trailer chassis. For this purpose, said casing may be fitted in and welded to a channel member 17, as indicated by dotted lines in Figure 4, which channel member may be a fixed internal part of the raised frame portion 13. Loosely disposed within the casing 16 is a cylinder 18 having an annular top flange 19 which rests upon the upper edge of the casing 16. This cylinder 18 is centered and secured in the casing 16 by a plurality of set screws 20 threaded through the wall of casing 16 and engaged in recesses 21 provided in the cylindrical wall of the cylinder 18 near the bottom of the latter. Slidably fitted in the cylinder 18 is a piston 22 having a projecting upper end formed with an enlarged head 23 that is suitably fitted and secured in a central bottom recess 24 provided on the under side of the lower bearing disc 12 of the fifth wheel. It will be noted that the bunk 6 comprises a horizontal bar of H form in cross section and indicated by the numeral 25, the upper bearing disc 11 of the fifth wheel being formed on a block 26 fitted and secured in the lower channel of said bar 25, as shown in Figure 2 and generally illustrated in Figure 1. Rigid with and rising from the upper end of piston 22 centrally of the latter is the king bolt 14 that extends centrally through the discs 11 and 12 and block 26, as well as the central horizontal web of the bunk bar 25. Thus, the bunk is capable of turning movement relative to the chassis frame of the trailer and vice versa. The bunk includes the usual stakes at the ends of the bar 25 mounted in and projecting upwardly from the upper channel of said bar 25 in the usual manner and one of which is generally indicated at 27. The only modification made so far is that the lower bearing disc 12 of the fifth wheel is mounted on the upper end of the piston 22 and piston 22 carries the king bolt 14, the discs 11 and 12 of the fifth wheel construction being sustained by said piston. It is thus apparent that the bunk and fifth wheel are capable of vertical movement relative to the chassis frame of the trailer and with piston 22. Set screws 28 extend through casing 16 and cylinder 18 and have their inner ends disposed in longitudinal grooves 29 provided in the piston 22 so as to limit movement of the latter and prevent its withdrawal from cylinder 18. As shown, the piston 22 comprises a solid cylindrical block of metal having a packing disc 30 secured against its lower end by means of a retaining disc 31 and a securing bolt 32 that passes through disc 31 and disc 30 and is threaded into the lower end of piston 22 axially of the latter. Extending through piston 22 is a bleeder passage 33 that opens through one side of the piston above cylinder 18 and that communicates at its lower end with a nozzle 34 carried by the piston and opening through the discs 30 and 31 below the lower end of the piston.

Attached to one side of the casing 16 is a pressure responsive element 35 constituting part of a conventional type of electrical weight indicating means which also includes an indicator 36 electrically connected at 37 with said pressure responsive device 35. In practice, the indicator 36 will be placed in the cab of the lumber truck, and the pressure responsive device 35 communicates with the interior of cylinder 18 below the piston 22 through a port indicated at 38 in Figure 2. Casing 16 provides a very rigid and durable construction in which the cylinder 18 is effectively protected and removably mounted to facilitate renewal or repair of parts.

In operation, fluid under pressure is introduced into cylinder 18 below the piston 22 through passage 33 until the indicating hand of indicator 36 is exactly at zero on its dial when the bunk 6 has no load or logs disposed thereon. When this is done, the piston will normally occupy its elevated position, as shown in Figure 2. It might be here noted that the diameter of the cylinder and its piston is relatively large so that very little fluid displacement is required in the operation of the device and therefore very little movement of the piston. When a load is imposed upon the bunk 6, the latter is depressed by such load and causes downward movement of piston 22 for a distance proportional to the load, the weight of such load being accurately indicated by the indicator 36. Any suitable valve means may be provided for controlling the flow of fluid through passage 33 in initially conditioning the device or adjusting it from time to time as may be required due to leakage.

From the foregoing description, it is believed that the construction and operation, as well as the advantages, of the present invention will be readily understood and appreciated by those skilled in the art. Minor changes may be made in details of construction illustrated and described, such as fairly fall within the spirit and scope of the invention as claimed.

What we claim is:

1. In a load weighing device for vehicles, the combination of a wheeled chassis frame, a cylinder rigidly mounted in said frame, a piston vertically movable in and projecting above the cylinder, means to facilitate the introduction of fluid under pressure into the cylinder below the piston, load indicating means including a pressure responsive device communicating with the cylinder below the piston, a load support vertically movable with the piston, and a fifth wheel construction between the load support and the piston including a lower bearing disc mounted on the piston, an upper bearing disc fixed to the load support and resting on the lower bearing disc, a king bolt carried by the piston and extending centrally through the bearing discs and the load support, an open top casing fixed in the chassis frame, said cylinder being removably disposed in said casing, and means carried by the casing and engaging the cylinder to releasably retain the latter in said casing.

2. In a lumber truck, the combination of a wheeled chassis frame, a stationary cylinder rigidly mounted in said frame, a piston vertically movable in and projecting above the cylinder, a lumber bunk mounted on and vertically movable with the piston, a fifth wheel construction between the lumber bunk and the piston, load indicating means including a pressure responsive device communicating with the cylinder through a side of the latter below the piston, and means to facilitate the introduction of fluid under pressure into the cylinder below the piston.

3. In a load weighing device for vehicles, the combination of a wheeled chassis frame, a cylinder rigidly mounted in said frame, a piston vertically movable in and projecting above the cylinder, means to facilitate the introduction of fluid under pressure into the cylinder below the piston, load indicating means including a pressure responsive device communicating with the cylinder below the piston, a load support vertically movable with the piston, a fifth wheel construction between the load support and the piston including a lower bearing disc mounted on the piston, an upper bearing disc fixed to the load support and resting on the lower bearing disc, a king bolt carried by the piston and extending centrally through the bearing discs and the load support, a casing fixed in the chassis frame, said cylinder being removably secured in said casing, and means carried by the casing and cylinder and engaging the piston to limit upward movement of the latter so as to prevent withdrawal of said piston from the cylinder.

HOWARD R. POSTON.
PAUL C. FELKEL.